United States Patent
Mori

(10) Patent No.: US 7,890,142 B2
(45) Date of Patent: Feb. 15, 2011

(54) PORTABLE TELEPHONE SOUND REPRODUCTION BY DETERMINED USE OF CODEC VIA BASE STATION

(75) Inventor: Hisayuki Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 1171 days.

(21) Appl. No.: 11/547,006

(22) PCT Filed: May 18, 2005

(86) PCT No.: PCT/JP2005/009025

§ 371 (c)(1),
(2), (4) Date: Oct. 2, 2006

(87) PCT Pub. No.: WO2005/119940

PCT Pub. Date: Dec. 15, 2005

(65) Prior Publication Data

US 2007/0207817 A1    Sep. 6, 2007

(30) Foreign Application Priority Data

Jun. 1, 2004  (JP)  .............................. 2004-163310

(51) Int. Cl.
*H04W 4/18* (2009.01)
*H04W 88/08* (2009.01)

(52) U.S. Cl. ...................... 455/561; 455/3.06; 455/524; 455/414.4

(58) Field of Classification Search ........................ None
See application file for complete search history.

(56) References Cited

U.S. PATENT DOCUMENTS

2005/0197108 A1 *   9/2005   Salvatore et al. ......... 455/414.3

FOREIGN PATENT DOCUMENTS

| JP | 05-063833 A | 3/1993 |
|---|---|---|
| JP | 09-046250 A | 2/1997 |
| JP | 11-055716 A | 2/1999 |
| JP | 2000-308139 A | 11/2000 |
| JP | 2001-077947 A | 3/2001 |
| JP | 2001-127769 A | 5/2001 |
| JP | 2001-195100 A | 7/2001 |
| JP | 2002-247156 A | 8/2002 |
| JP | 2003-274016 A | 9/2003 |
| WO | WO 00/54529 | 9/2000 |

\* cited by examiner

*Primary Examiner*—Philip J Sobutka
(74) *Attorney, Agent, or Firm*—Sughrue Mion, PLLC

(57) ABSTRACT

To realize high quality reproduction of sound on a portable telephone by suppressing deterioration in quality of sound data being provided through a wireless communication network while sustaining the quality of sound in the portable telephone there is provided sound data to a portable telephone through a wireless base station, the wireless base station transmitting sound data to the portable telephone by codec, the sound data being encoded previously in compliance with the codec of the portable telephone.

13 Claims, 12 Drawing Sheets

PORTABLE TELEPHONE SOUND REPRODUCTION BY DETERMINED USE OF CODEC VIA BASE STATION

This application claims priority from PCT Application No. PCT/JP2005/009025 filed May 18, 2005, and from Japanese Patent Application No. 2004-163310 filed Jun. 1, 2004, which applications are incorporated herein by reference.

TECHNICAL FIELD

The present invention relates to a sound source providing system, and in particular, relates to a sound source providing system which provides sound to a portable telephone over a portable telephone network. Further, the present invention relates to a sound source providing method, sound source providing device, and a program for providing sound.

BACKGROUND ART

As portable telephones have been widely used, a technique for improving voice quality at the time of talking in portable telephones is installed. Main CODEC for each portable telephone system will be shown below, in which system:CODEC, transmission band (Kbit/sec), and voice band (Kbit/sec) are shown in this order.

PHS: ADPCM, 32, 32

PDC Full rate: VSELP, 11.2, 6.7

PDC Half rate: PSI-CELP, 5.6, 3.45

GSM: RPE-LTP, 22.8, 13

CdmaOne: EVRC, 9.6. 8

WCDMA(FOMA): AMR, 38.6. 12/23

Fixed-line telephone (reference): PCM, 64, 64

Note that transmission band means a band of the whole wireless section, and voice band means a partial band where voice signals flow of the transmission band.

For example, encoding processing by EVRC CODEC used in a CDMA network is performed in the procedure shown in FIG. 10. First, in response to a voice analog input (step S101), the voice analog input signal is normalized (step S102). Then, band filtering in analog signals (removal of low frequency components and high frequency components) (step S103) and analog/digital conversion processing (quantization: from analog to linear PCM) (step S104) are performed. Then, among voice waveforms, small amplitude parts are deleted (step S105), and a speaker is recognized, and noise removal processing is performed (step S106). Then, voice signals are encoded (step S107) and converted to codes for transmission (redundant configuration, addition of error correction codes) (step S108).

By encoding voices in accordance with the above-described procedure, in the small amplitude part compression processing in step S105, in the case of no-voice section or noise section, only noise signals are transmitted so as to lower the transmission rate. Thereby, it is possible to reduce power required for transmission and power consumption of a mobile terminal. Further, in the processing of step S106, background noises are reduced to thereby improve the sound quality (clarify) of voice in talking.

Patent Document 1: Japanese Patent Laid-Open Publication No. 11-55716

Patent Document 2: Japanese Patent Laid-Open Publication 2002-247156

DISCLOSURE OF THE INVENTION

Problems to be Solved by the Invention

On the other hand, portable telephones are increasingly used for listening to music in recent years. In particular, as services in which music flows on a portable telephone network, the following ones are provided: (1) music preview: making a call to a music preview provider and designating a desired music to preview the music, (2) ring-back melody service: when A makes a call to B, A listens to a melody designated by B during calling instead of a ring-back tone, and (3) self ring-back melody service: when A makes a call to B, B listens to a melody designated by A during calling instead of a ring-back tone.

When listening to music with a portable telephone by using services as described above, a sound source file provided by a music provider is transmitted directly to a terminal of someone who listens to the music over a portable telephone network. If a person A who listens to music uses a narrow-band portable telephone (PDC, GSM, CDMAOne), there was a problem that sound quality deteriorated due to voice CODEC characteristics of the portable telephone network during transmission from the terminal to a base station. Now, with reference to FIG. 11, the above-mentioned ring-back melody service will be described in brief, and further, music data flow in the case of CDMAOne network and a state of sound quality deterioration will be described.

As shown in FIG. 11, when a call is made from a calling side portable telephone U101 to a receiving side portable telephone U102 subscribing the ring-back melody service, the state of the receiving side portable telephone U102, which is a subscriber, is checked via wireless base stations 101 and 104, mobile switching centers 102 and 103 (hereinafter referred to as MSC), a gateway switch 105 (hereinafter referred to as GS) and the like (arrows L1, L2, L3, L4, L5), which constitute portable telephone network 110 receiving the calling request. At this time, the MSC 102 of the calling side portable telephone U101 accesses a subscriber service management server 106 via the GS 105 to check whether the receiving side portable telephone U102 subscribes the ring-back melody service by referring to a subscriber database 107 (arrow L6). If the receiving side portable telephone U102 subscribes the service, an activation request is made from the MSC 102 to a melody reproduction control server 108 so as to request to transmit music data designated by the subscriber to the calling side portable telephone U101 instead of a ring back tone (arrow L7).

Then, the melody reproduction control server 108 reads out a sound source file of WAV format from a sound source database 109 (arrow M1), converts it to data of PCM 64 Kbit/sec, and transmit the data to the wireless base station 101 via the GS 105 and the MSC 102 (arrows M2, M3, M4). Therefore, deterioration in sound quality will never be caused during transmission from the melody reproduction control server 108 to the wireless base station 101. In the wireless base station 101, encoding is performed corresponding to CODEC of the calling side portable telephone U101. For example, encoding for EVRC CODEC of 8 Kbit/sec is performed. Accordingly, significant deterioration of the music sound quality is caused in this section (arrow M5). That is, in the wireless base station 101, EVRC CODEC which is voice encoding processing by an algorithm same as the above-mentioned processing shown in FIG. 10 is performed, so the sound quality of the music data deteriorates.

Now, deterioration in music mentioned above will be described in detail. The deterioration is due to processing to clarify voice, which is a characteristic of the EVRC CODEC described above. Specifically, the deterioration is caused since in the processing of step S105 mentioned above, small amplitude parts are removed following normalization of analog signals and band filtering. That is, relating to music data, parts where dynamic range is large and volume is large and those are small change continuously. For example, since a small volume part in a section shown by the reference sign X relative to the music data (waveform) as shown in FIG. 12(a), that is, a small amplitude part X, is removed (see FIG. 12(b)), the music is interrupted partly, whereby a problem of deterioration in sound quality is caused.

Further, in the processing in step S106, a function unique to voice CODEC in which background noises are removed so as to improve voice clarity is carried out. However, such a function has a reference value therein for identifying voice and noise, so by comparing the reference value with a prediction gain of an input signal, voice and noise are identified. That is, if a prediction gain is larger than the reference value, it is identified as voice. In voice CODEC, 20 msec (160 sample) is encoded as one frame. If correlation between signal frames is small, prediction gain becomes small. At this time, in the case of voice, correlation between frames is quite large and the prediction gain is large when considered in 20 msec unit, but in the case of noise, prediction gain is small since it is a random signal. In the case that sound changes significantly such as orchestra or rock music, correlation between frames is small and prediction gain is small, so it is highly possible to be considered as noise. Further, in the case of orchestra or rock music, the music is largely distributed in wide frequency band when considered from frequency space, so it may have frequency characteristics similar to noises. Accordingly, in the case of music like this, deterioration in sound quality is significant. Then, if it is considered as noise, voice encoding is not performed and only signals considered as noises are transmitted. In a frame (per 20 ms) where a noise identified signal is received, a low-level pseudo noise (white noise) is reproduced in the receiving terminal side, so the music is not reproduced same as the original one, whereby a problem of deterioration in sound quality is caused.

When the function described above is removed from the existing CODEC provided in a portable telephone or in a wireless base station, deterioration in sound quality of music can be prevented, but a noise removal function does not work, so general voice talk quality will deteriorate, whereby the specification of the voice CODEC cannot change. Further, even if the noise removal function is eliminated, it takes considerable works to construct a CODEC device of such an algorithm. Further, a problem that it takes considerable costs to replace those having been provided in portable telephones and wireless base station is caused.

A technique for preventing deterioration in sound quality is disclosed in Patent Document 1 mentioned above. Patent Document 1 discloses a codec through system in which in a voice talk between portable telephones, if same CODEC is used in the same portable telephone network in the terminals, encoded signals used between the base station and the terminal are exchanged directly between the terminals without being converted to PCM in the portable telephone network. Thereby, the number of encoding by CODEC is reduced so as to prevent deterioration in voice quality. However, the technique described in Patent Document 1 is a codec through technique relating to voice data at the time of talking, so it cannot be used to improve sound quality of a sound source file. In other words, assuming that transmission is performed by using codec through for the sound source file as well, the sound quality deteriorates in the state of initial voice encoding processing, as described above.

Further, although a technique for enabling reproduction of high-quality music together with voice in a telephone device is disclosed, it is not a technique to prevent deterioration in sound quality of music data transmitted over a wireless communication network. That is, the problem of deterioration in sound quality by CODEC of the sound source file is not solved same as the case described above.

An object of the present invention is to provide a sound source providing system capable of preventing deterioration in sound quality to be provided over a wireless communication network and realizing reproduction of high-quality sound such as music in portable telephones, while solving the inconveniences involved in the above-described conventional examples and particularly, maintaining the sound quality in the portable telephones.

Means for Solving the Problems

A music providing system, which is the present invention, is a system for providing sound to a portable telephone via a wireless base station, comprising a sound data transmission unit for transmitting sound to the portable telephone by codec through in the wireless base station. The sound is data previously encoded corresponding to CODEC of the portable telephone.

Instead of the sound data, sound encoded by encoding processing for encoding without noise removal processing may be used.

With this configuration, in the system for providing sound to a portable telephone on a portable telephone network, sound data previously encoded by encoding processing corresponding to the CODEC type of a portable telephone is accumulated in the present invention. Particularly, in the encoding processing, encoding not involving noise removal processing which is performed in encoding processing of sound data is performed, so sound data, in which loss of sound waveform is small and quality is not deteriorated, is accumulated. Since the sound data to be provided to the portable telephone is one corresponding to the CODEC type of the portable telephone, it is possible to transmit it to the portable telephone by codec through without performing encoding processing by using CODEC in the base station. Accordingly, the sound data to be transmitted to the portable telephone is transmitted without being subject to noise removal processing same as sound data at the time of transmission, so quality deterioration can be prevented. Thereby, it is possible to reproduction sound having no quality deterioration in the portable telephone.

Further, as a more specific configuration of the sound source providing system which is the present invention, the portable telephone is one in which voice encoding processing including noise removal processing is performed to voice when talking, and the system further comprises: a sound data storing unit for accumulating sound data previously encoded by encoding processing corresponding to the CODEC type of the portable telephone; a CODEC type detection unit for detecting the CODEC type of the portable telephone; and a music data transmission unit for obtaining sound data corresponding to the detected CODEC type of the portable telephone from the sound data storing unit, and transmitting the sound data to the portable telephone by codec through in the wireless base station.

In addition to the above-mentioned configuration, the system further comprises a codec through availability inquiring unit for inquiring whether transmission of the sound data to the portable telephone by codec through is available in the wireless base station. As a result of inquiring by the codec through availability inquiring unit, if the codec through is available, the sound data transmission unit has a function of transmitting sound data corresponding to the CODEC type detected by the CODEC type detection unit to the portable telephone.

In addition to the above-mentioned configuration, the sound data is data encoded without noise removal processing in the encoding processing, different from the encoding processing.

In the system with the above-mentioned configurations, first, sound data encoded corresponding to a plurality of CODEC types are previously accumulated in the system. Before transmitting the sound data, the CODEC type of the destination portable telephone is detected. Then, encoded sound data corresponding to the detected CODEC type is extracted, and is transmitted to the portable telephone by codec through. Accordingly, it is possible to securely transmit sound data to the destination portable telephone by codec through to thereby provide sound not involving quality deterioration. Further, it is checked whether codec through is available in the destination portable telephone in advance, and according to the result, sound data corresponding to the CODEC type of the portable telephone is transmitted. Therefore, it is possible to provide sound not involving quality deterioration more securely.

In addition to the above-mentioned configurations, it is desirable that the sound data transmission unit operate to transmit the sound data instead of a ring-back tone of the portable telephone. Thereby, at the time of calling on the portable telephone, sound not involving quality deterioration is reproduced. In contrast, at the time of talking, encoding processing involving noise removal processing is performed in transmitting sound data as conventional cases, so sound quality can be maintained as well.

Further, the present invention also includes a sound source providing device constituting the sound source providing system, a program for controlling the device, and a method realized in the device.

That is, a sound source providing device, which is the present invention, is a sound source providing device in which sound data to be provided to a portable telephone by codec through in a wireless base station is accumulated. The sound data accumulated is data previously encoded by encoding processing corresponding to the CODEC of the portable telephone.

Further, as another configuration, instead of the sound data, sound data previously encoded by encoding processing for encoding without noise removal processing corresponding to the CODEC of the portable telephone is used.

In addition to the above-mentioned configurations, it is desirable that the device further comprise: a CODEC type detection unit for detecting a CODEC type of the portable telephone; a sound data transmission unit for transmitting sound data corresponding to the CODEC type of the portable telephone, among the sound data accumulated, to the portable telephone by codec through in the wireless base station.

Further, in addition to the above-mentioned configurations, it is desirable that the device further comprise: a codec through availability inquiring unit for inquiring whether transmission of the sound data to the portable telephone by codec through is available in the wireless base station, and as a result of inquiry by the codec through availability inquiring unit, if codec through is available, the sound data transmission unit have a function of transmitting sound data corresponding to the CODEC type detected by the CODEC type detection unit to the portable telephone.

Further, a program for providing sound is a program to realize respective units and functions described above in a computer which is the sound source providing device.

A sound source providing method is a method of providing sound to a portable telephone by using a computer for providing sound, comprising: a CODEC type detecting step to detect the CODEC type of the portable telephone; a sound data selecting step to extract sound data corresponding to the CODEC type detected in the CODEC type detecting step, among sound data previously encoded by encoding processing corresponding to the CODEC of the portable telephone and accumulated; and a sound data transmitting step to transmit the extracted sound data to the portable telephone by codec through in the wireless base station.

As another configuration, a method of providing sound data to a portable telephone by using a computer for providing sound comprises: a CODEC type detecting step to detect the CODEC type of a portable telephone; a sound data selecting step to extract sound data corresponding to the CODEC type detected in the CODEC type detecting step, among music data previously encoded corresponding to the CODEC of the portable telephone by encoding processing without noise removal processing, different from encoding processing of a portable telephone, and accumulated; and a sound data transmitting step to transmit the extracted sound data to the portable telephone by codec through in the wireless base station.

Further, in addition to the above-mentioned configuration, it is desirable that the method further comprise a codec through availability inquiring step to inquire whether transmission of the sound data to the portable telephone by codec through is available in the wireless base station, before the sound data transmitting step, and as a result of inquiry in the codec through availability inquiring step, if codec through is available, sound data corresponding to the CODEC type detected in the CODEC type detecting step be transmitted to the portable telephone in the sound data transmitting step.

As described above, the device, method and program of the above-mentioned configurations operate same as the system described above, so the object mentioned above can be achieved.

Further, a sound source providing system, which is the present invention, is also a system for providing music via a wireless base station to a portable telephone in which encoding processing including noise removal processing is performed to voice at the time of talking, comprising: a CODEC type detection unit for detecting the CODEC type of the portable telephone; a sound data encoding unit for encoding sound data, previously stored, by encoding processing corresponding to the CODEC type detected by the CODEC type detection unit; and a sound data transmission unit for transmitting the encoded sound data to the portable telephone by codec through in the wireless base station.

In addition to the above-mentioned configuration, the system may further comprise a codec through availability inquiring unit for inquiring whether transmission of the sound data to the portable telephone by codec through is available in the wireless base station, and as a result of inquiry by the codec through availability inquiring unit, if codec through is available, the sound data encoding unit may have a function of creating sound data corresponding to the CODEC type detected by the CODEC type detection unit.

Moreover, the sound data encoding unit may perform encoding without noise removal processing in the encoding processing, different from encoding processing.

With this configuration, first, the CODEC type of the destination portable telephone is detected before transmitting sound data, and corresponding to the CODEC type detected, a sound file previously prepared is encoded for transmission in the present invention. At this time, since it is encoded by encoding processing without noise removal processing same as the configurations described above, sound data having less quality deterioration can be created. Since the sound data corresponds to the CODEC of the portable telephone, the sound data can be transmitted to the portable telephone by codec through. Accordingly, it is possible to provide sound having no quality deterioration to the user of the portable telephone. Moreover, since it is checked whether codec through is available in the destination portable telephone beforehand, and according to the result, sound data corresponding to the CODEC type of the portable telephone is transmitted, it is possible to provide sound not involving quality deterioration more securely.

Further, a sound source providing device constituting the above-mentioned system is a sound source providing device in which sound data to be provided to a portable telephone by codec through in a wireless base station is accumulated, comprising a sound data encoding unit for encoding sound data to be provided to the portable telephone without noise removal processing.

Further, a method executed in the system is a method of encoding sound to be provided to a portable telephone by using an encoding device, in which sound data is read, and corresponding to the predetermined CODEC of the portable telephone, encoding processing is performed without noise removal processing different from the encoding processing.

Similarly, the method is a method of providing sound to a portable telephone by using a computer for providing sound, comprising: a CODEC type detection step to detect the CODEC type of a portable telephone; a sound data encoding step to perform encoding corresponding to the CODEC type detected by music encoding processing without noise removal processing different from sound encoding processing of a portable telephone; and a sound data transmitting step to transmit the encoded sound data to the portable telephone by codec through in the wireless base station.

Further, the present invention also provides a program for providing sound data so as to realize, in a computer for providing sound to a portable telephone: a CODEC type detection unit for detecting the CODEC type of the portable telephone; a sound data encoding unit for performing encoding in encoding processing without noise removal processing corresponding to the detected CODEC type, different from encoding processing of the portable telephone; and a sound data transmission unit for transmitting the encoded sound data to the portable telephone by codec through in the wireless base station.

With these configurations, the present invention acts same as the system described above, so the object can be achieved.

Further, the present invention provides a sound source providing system comprising a wireless base station which performs encoding including noise removal processing to voice at the time of talking and a sound source providing device which transmits sound data to a portable telephone via the wireless base station, in which the wireless base station includes a music encoding unit for performing encoding without noise removal processing to sound data transmitted from the music providing device, different from encoding, corresponding to the CODEC of the portable telephone.

With this configuration, music data transmitted from the sound source providing device over a portable telephone network is encoded corresponding to the CODEC of the portable telephone in a wireless base station, but the sound data is data encoded by CODEC for sound not including noise removal processing, different from CODEC including noise removal processing. Accordingly, sound is transmitted to the portable telephone with the quality not being deteriorated, whereby the user can reproduce high-quality sound same as the cases described above.

Effects of the Invention

The present invention is configured and works as described above. Thereby, sound is encoded without noise removal processing, so quality deterioration at the time of encoding is prevented. Further, since the sound data is transmitted to a portable telephone by codec through, encoding is not performed at the time of transmission, whereby quality deterioration at the time of transmission is also prevented. Accordingly, it is possible to transmit sound data not involving quality deterioration to a portable telephone, so a user can obtain high-quality sound. Further, since noise removal is performed same as conventional cases in transmitting sound at the time of talking, it is also possible to maintain the quality of the sound. These are excellent effects not having been exhibited conventionally.

Best Mode for Carrying Out the Invention

The present invention is characterized in that at the time of data transmission over a portable telephone network, for sound in talking, sound quality is improved by performing encoding processing including noise removal processing as conventional cases, and for sound such as music to be provided, it is encoded by encoding processing without noise removal processing which is a characteristic of the present invention and transmitted to thereby prevent quality deterioration due to CODEC characteristics.

For example, music data which is a kind of sound transmitted over a portable telephone network includes music data provided instead of a ring-back tone, which is provided to a portable telephone from a music providing device over a portable telephone network. Hereinafter, a case of providing a ring-back melody service described above over a CDMA network will be described in embodiments. Although description will be given for the case where music data is given as sound to be transmitted over a portable telephone network, the sound is not limited to music data. Further, music data used as the sound is not limited to music data provided by the ring-back melody service instead of a ring-back tone.

Embodiment 1

A first embodiment of the present invention will be described with reference to FIGS. 1 to 5. FIG. 1 is a schematic illustration showing the overall system configuration according to the first embodiment of the present invention. FIG. 2 is a function block diagram showing the configuration of a melody reproduction control server. FIG. 3 is a flowchart showing the flow of music encoding processing. FIG. 4 is a flowchart showing the operation of the melody reproduction control device. FIG. 5 is a sequence chart showing the operation of the overall system.

<Configuration>

As shown in FIG. 1, a system realizing a ring-back melody service includes, as the basic configuration, a calling side portable telephone U1, a receiving side portable telephone U2, a portable telephone network 50, wireless base stations 51 and 52 provided in the portable telephone network 50, a gateway switch (GS) 53 and mobile switching centers (MSC) 54 and 55, which enable communications through portable telephones, and further, a melody reproduction control server 1, connected with the MSC 51 and the GS53, for providing music, and a subscriber service management server 3 for registering and managing users subscribing the ring-back melody service. The melody reproduction control server 1 includes a sound source database 2 in which music data to be provided is accumulated, and the subscriber service management server 3 includes a subscriber database 4.

Since the specific configuration of the ring-back melody service has been described in the description of the conventional example, the detailed description is omitted. In FIG. 1, a calling side terminal is denoted by the reference sign U1, and a receiving side terminal is denoted by the reference sign U2. Further, arranged state of the wireless base stations 51 and 52, the MSC 54 and 55 and the GS 53 is not limited to the state shown in FIG. 1. For example, the melody reproduction control server 1 may be activated by the MSC 55 positioned on the side of the receiving side terminal U2.

The present embodiment of the invention is characterized in the melody reproduction control server 1, so the configuration and operation of the melody reproduction control server 1 will be mainly described in detail. That is, when a call is made from the calling side terminal U1 to the receiving side terminal U2 subscribing the ring-back melody service, a state after the melody reproduction control server 1 is activated by the MSC 54 will be described below.

<Configuration>

The configuration of the melody reproduction control server 1 will be described with reference to FIG. 2. The server 1 consists of a general server computer, and with a prescribed program being installed, a processor (see FIG. 2) as described below is constructed in the CPU 10.

First, the melody reproduction control server 1 includes: a melody reproduction instruction receiver 11 which receives an activation instruction from the MSC 54 via the GS 53; a codec through availability inquiring block 12 (codec through availability inquiring unit) for inquiring whether transmission of music data is available by codec through in a wireless base station to the calling side portable telephone U1; a CODEC type detection block 13 (CODEC type detection unit) for detecting the CODEC type of the calling side portable telephone U1; and a music data transmitter 14 (music data transmission unit) which transmits music data corresponding to the CODEC type of the calling side portable telephone U1 to the portable telephone U1 by codec through in the wireless base station 52.

Further, in a sound source database 2 which is a storage device thereof, a music data storage 20 (music data storing unit) which stores music data to be provided to the portable telephone U1 is formed, in which music data previously encoded by music encoding processing corresponding to the CODEC type of the portable telephone is accumulated. Each configuration mentioned above will be described below in more detail.

First, music data stored on the music data storage 20 is music data encoded corresponding to the CODEC type as described above. For example, it is music data encoded corresponding to EVRC CODEC of 8 Kbit/sec used in CDMA-One (EVRC music data (21)).

Processing to encode music data stored on the music data storage 20 is music encoding processing different from encoding of voice data. The processing will be described with reference to the flowchart of FIG. 3.

First, when music of analog signals, which is sound source, is inputted (step S1), the music analog input signals are normalized (step S2), and the analog signals are band-filtered (low frequency components and high frequency components are removed) (step S3). Then, the analog signals are converted to digital (step S4), and are encoded to music data of 8 Kbit/sec corresponding to EVRC CODEC (step S5). Then, they are converted to codes for transmission by making them to have a redundant configuration, adding error correction codes and the like (step S6).

By comparing the music encoding processing with the voice encoding processing (see FIG. 10), it is found that processing to remove small amplitude parts of step S105 in FIG. 10 and speaker recognition/noise removal processing of step S106 are not performed. Therefore, in the music encoding processing, it is possible to realize encoding of music data in which deterioration in music is prevented, by the noise removal processing performed in the above-described voice encoding processing. In this processing, the music data is previously encoded by a music data encoder not shown and is stored on the sound source database 2. In FIG. 2, although only music data for EVRC CODEC is shown, of course music data encoded corresponding to other CODEC types is previously prepared and stored as well.

When the melody reproduction instruction receiver 11 receives an instruction to distribute music data to the calling side portable telephone U1 from the MSC 54, it notifies the codec through availability inquiring unit 12 of the instruction. Then, the codec through availability inquiring unit 12 inquires the GS 53 whether music data is transmittable by codec through to the calling side portable telephone U1, and receives the reply. When it receives the reply that it is available, it notifies the CODEC type detection unit 13.

The CODEC type detection unit 13 inquires the MSC 54 of the CODEC type of the calling side portable telephone U1 via the GS 53, and by receiving the reply, it detects the CODEC type of the calling side portable telephone U1. Then, it notifies the music data transmitter 14 of the detected CODEC type.

The music data transmitter 14 reads out music data encoded in the music encoding processing corresponding to the CODEC notified from the CODEC type detection unit 13 from the music data storage 20, and transmits the music data to the calling side portable telephone U1 via the GS 53, the MSC 54 and the wireless base station 51. At this time, since a codec through instruction is given to the GS 53, MSC 54 and the wireless base station 51, the music data is transmitted to the portable telephone U1 in the state same as that stored on the sound source database 2, without voice encoding being performed in the wireless base station 52. Note that in the example shown in FIG. 1, since it is a CDMA network, music data encoded in 8 Kbit/sec corresponding to the EVRC CODEC is transmitted.

If codec through connection is not available in the portable telephone network, music data is transmitted in the voice mode (PCM:64 K). Further, if music data encoded conforming to the CODEC type of the calling side portable telephone is not stored, music data is transmitted in the voice mode (PCM:64 K).

<Operation>

Next, operation in the present embodiment will be described with reference to FIGS. 4 and 5. FIG. 4 is a flowchart showing the operation of the melody reproduction control server 1, and FIG. 5 is a sequence chart showing the operation of the whole system. Further, with reference to FIG. 1, flow of music data is also shown.

First, when the calling side portable telephone U1 makes a call to the receiving side portable telephone U2 (step S31 in FIG. 5), the MSC 54 inquires the subscriber service management server 3 whether the receiving side portable telephone subscribes to the ring-back melody service, and obtains the reply (not shown). If it subscribes, the MSC 54 gives an activation instruction to the melody reproduction control server 1 via the GS 53 so as to feed music data instead of a ring-back tone (step S32 in FIG. 5).

Then, the melody reproduction control server 1 receiving the activation instruction (step S11 in FIG. 4) inquires the GS 53 whether the codec through is available (step 12 in FIG. 4, step S33 in FIG. 5, codec through availability inquiring step). Then, it receives a replay to the inquiry (step S34 in FIG. 5) from the GS 53, and if codec through is determined as available (positive determination in step S13 in FIG. 4), it inquires the MSC 54 of the calling side of the CODEC type of the calling side portable telephone U1 via the GS 53 (step S14 in FIG. 4, step S35 in FIG. 5, CODEC type detecting step). Then, it receives a reply thereto (step S36 in FIG. 5) and finds the CODEC type. If the CODEC type is supported (positive determination in step S15 in FIG. 4), music data encoded corresponding to the CODEC type is searched from the sound source database (step S16 in FIG. 4).

If music data corresponding to the CODEC type exists (positive determination in step S17 in FIG. 4), such music data is read out (step S18 in FIG. 4, steps S37 and S38 in FIG. 5, music data selecting step). Accordingly, the music data has been encoded to the format corresponding to the EVRC CODEC of 8 Kbit/sec for example, corresponding to the codec of the portable telephone (see arrow A1 in FIG. 1).

Then, the melody reproduction control server transmits the music data to the calling side portable terminal U1 (step S20 in FIG. 4, step S40 in FIG. 5, music data transmitting step) while giving a codec through instruction to the GS 53 and MSC 54 (step S19 in FIG. 4, step S39 in FIG. 5, see arrows B1, B2, B3 in FIG. 1). Thereby, music data is transmitted to the portable telephone in the initial encoded state (e.g., format corresponding to EVRC CODEC of 8 Kbit/sec) without being encoded on the transmission path (arrows A2, A3, A4, A5 in FIG. 1). Accordingly, music data having less deterioration is transmitted to the calling side portable telephone U1, so since the music data is reproduced on the portable telephone, the user can listen to high-quality music during ring-back (step S41 in FIG. 5)

Then, when the receiving side portable telephone U2 replies (positive determination in step S21 in FIG. 4, step S42 in FIG. 5), that is, when the user of the receiving side answers the phone, a cutting instruction is given to the melody reproduction control server 1 by the GS 53 (step S43 in FIG. 5), so the server 1 stops transmission of the music data (step S22 in FIG. 4) and gives a codec through release instruction to the GS 53 and the MSC 54 (step S23 in FIG. 4, step S44 in FIG. 5).

Then, a talk becomes possible between the calling side portable telephone U1 and the receiving side portable telephone (steps S45, S46 in FIG. 5). At this time, since voice data is encoded by voice CODEC conventionally installed in the portable telephones U1 and U2 and the wireless base stations 51 and 52, it is possible to maintain a clear talk easy to listen in which noises are removed.

Although the case of CDMA network has been described above, the present invention is capable of creating music data in which music encoding processing without noise removal processing is performed corresponding to each of other CODEC types having noise removal function. Accordingly, by previously accumulating music data conforming to respective CODEC types in the sound source database 2, it is possible to provide music with no quality deterioration to all users.

On the other hand, when it is determined that codec through is not available (negative determination in step S13 in FIG. 4), if the detected CODEC type of the portable telephone is not supported (negative determination in step S15 in FIG. 4), or if there is no music data corresponding to the detected CODEC type (negative determination in step S17 in FIG. 4), music data in WAV format previously prepared in the sound source database is read out same as the conventional case (step S24 in FIG. 4), and is transmitted to the calling side portable telephone U1 in the voice mode (PCM: 64 K) (step S25 in FIG. 4). Then, when the receiving side portable telephone U2 replies (step S26 in FIG. 4), transmission of the music data is stopped (step S27 in FIG. 4).

Embodiment 2

Next, a second embodiment of the present invention will be described with reference to FIGS. 6 to 9. FIG. 6 is a function block diagram showing the configuration of the melody reproduction control server 1 of the present embodiment. FIG. 7 is a flowchart showing the operation of the melody reproduction control server 1 in the present embodiment. FIG. 8 is a schematic diagram showing the configuration of the overall system of the present embodiment, showing a state of transmitting music data.

The present embodiment is characterized in that the melody reproduction control server 1 previously stores music data to be used in a service in WAV format or analog format on the sound source database, and at the time of transmission to the calling side portable telephone U1, checks the CODEC type of the calling side portable telephone U1, and creates music data by performing music encoding processing corresponding to the CODEC type, and then distributes it to the calling side portable telephone U1. That is, although the case where music data corresponding to respective CODEC types is accumulated in the melody reproduction control server 1 is exemplary shown in the embodiment 1, the present embodiment is not limited to such a configuration. Hereinafter, specific configuration and operation of the melody reproduction control server 1 will be described.

<Configuration>

As shown in FIG. 6, the melody reproduction control server 1 of the present embodiment adopts a configuration almost same as that of the embodiment 1. However, it is different in the following points.

First, in the music data storage 20 of the sound source database 2 in the present embodiment, analog music data or music data encoded to WAV format which is music to be transmitted to the calling side portable telephone U1 is stored. However, the music data stored on the storage 20 may be one encoded in any format, provided that it is in a state where sound quality is not deteriorated.

Further, the CPU 10 of the melody reproduction control server 1 in the present embodiment includes, in addition to the respective processors 11 to 14 described above, a music data encoding block 15 (music data encoding unit) for encoding music data (analog or WAV format) previously stored, serving as sound source, by music encoding processing corresponding to the CODEC type detected by the CODEC type detection unit. After a melody ring-back instruction is given and the CODEC type is detected, the music data encoding unit 15 reads out analog music data or music data in WAV format in the music data storage 20 described above, and performs music encoding processing without noise processing corresponding to the detected CODEC type. For example, encoding corresponding to the EVRC CODEC is performed.

Corresponding to it, the music data transmission unit 14 operates to give a codec through instruction and to transmit the music data encoded by the music data encoding unit 15 to the calling side portable telephone U1.

<Operation>

Next, referring to FIGS. 7 and 8, operation in the present embodiment will be described. Note that for processing same as that of the embodiment 1, detailed description thereof is omitted.

First, when a call is made from the calling side portable telephone U1 and the melody reproduction control server 1 is activated to reproduce music data to the portable telephone 1 instead of ring-back tone, capability of codec through and CODEC type of the portable telephone is checked (step S51 to step S54). Then, if it is a CODEC type which can be coped with (positive determination in step S55), analog data or music data in WAV format is read out from the sound source database (step S56, see arrow A11 in FIG. 8), and music encoding processing is performed corresponding to the detected CODEC type (step S57). For example, music data encoded corresponding to the EVRC codec is created.

Then, a codec through instruction is given (step S58, see arrows B11, B12, B13 in FIG. 8), and the newly created music data is transmitted to the calling side portable telephone U1 (step S59) same as the embodiment described above. Thereby, the music data is transmitted to the portable telephone without being encoded on the transmission path (arrows A12, A13, A14, A15 in FIG. 8). Accordingly, since music data having less deterioration in sound quality is transmitted to the calling side portable telephone U1, the user of the portable telephone can listen to the high-quality music during ring-back.

Note that processing after the receiving side portable telephone U2 replies (steps S60 to S62) and processing if codec through is not supported or the CODEC type is not supported (steps S63 to S66) are same as those of the embodiment 1, so they are omitted.

In this way, in the embodiment 2, it is possible to provide music data by codec through to any kind of portable telephone, so any user can listen to music without deterioration in sound quality.

Embodiment 3

Next, a third embodiment of the present invention will be described with reference to FIG. 9. In the present embodiment, a music CODEC for creating music data in the music encoding processing described above is installed in the wireless base station 51 together with the conventional voice CODEC.

That is, in the present embodiment, the wireless base station 51 includes a music CODEC device 51a (music CODEC unit) for performing music encoding without noise removal processing, different from voice CODEC, to music data transmitted from the melody reproduction control server 1 corresponding to the CODEC of the portable telephone, as shown in FIG. 9.

Then, the music data transmitted from the melody reproduction control server 1 is transmitted by PCM 64K same as the conventional case up to the wireless base station 51 (see arrows A21, 22, 23, 24 in FIG. 9). In the wireless base station 51, when the music data is received, it is determined that the received data is music data based on the data structure, characteristic data included in the data or a transmitting instruction from the melody reproduction control server 1, so the music data is encoded by the music CODEC device 51a not by a general voce CODEC. If the portable telephone uses a CDMA network for example, it is encoded to music data corresponding to EVRC CODEC, and transmitted to the portable telephone U1 (see arrow A25 in FIG. 9).

Thereby, the music data encoded by the music CODEC without noise removal processing is transmitted to the portable telephone, so the music data can be reproduced on the portable phone without any deterioration in the sound quality.

INDUSTRIAL APPLICABILITY

The present invention is applicable to, for example, a ring-back melody service which provides music to a portable telephone instead of a ring-back tone or a service in which a user makes a call to a music preview provider and selects a desired piece so as to preview the music. Thereby, it is possible to provide sound such as music without any deterioration in quality, so the present invention has industrial applicability.

Figure 1:
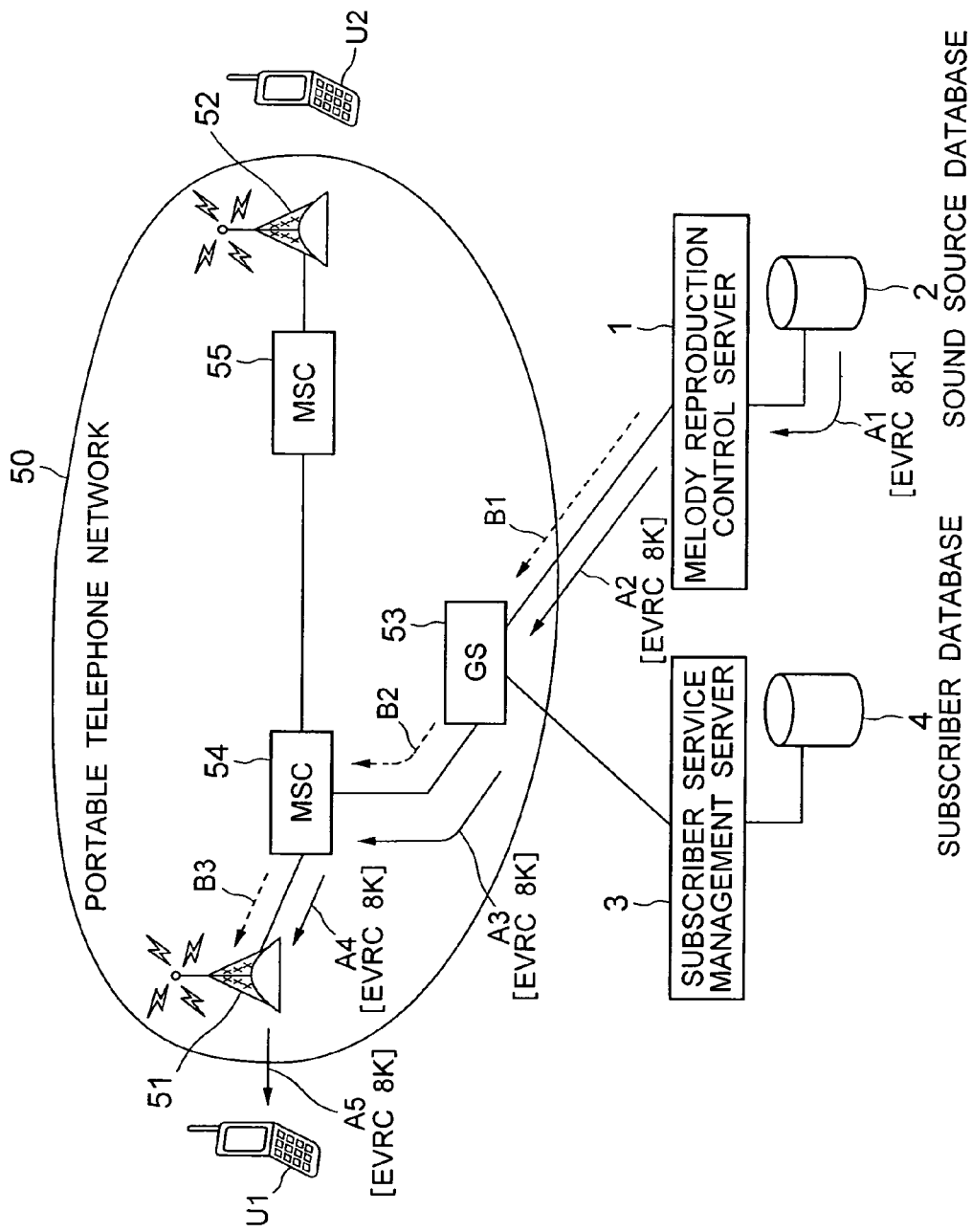
FIG. 1 is a schematic illustration showing the overall system configuration in the embodiment 1.
Figure 2:
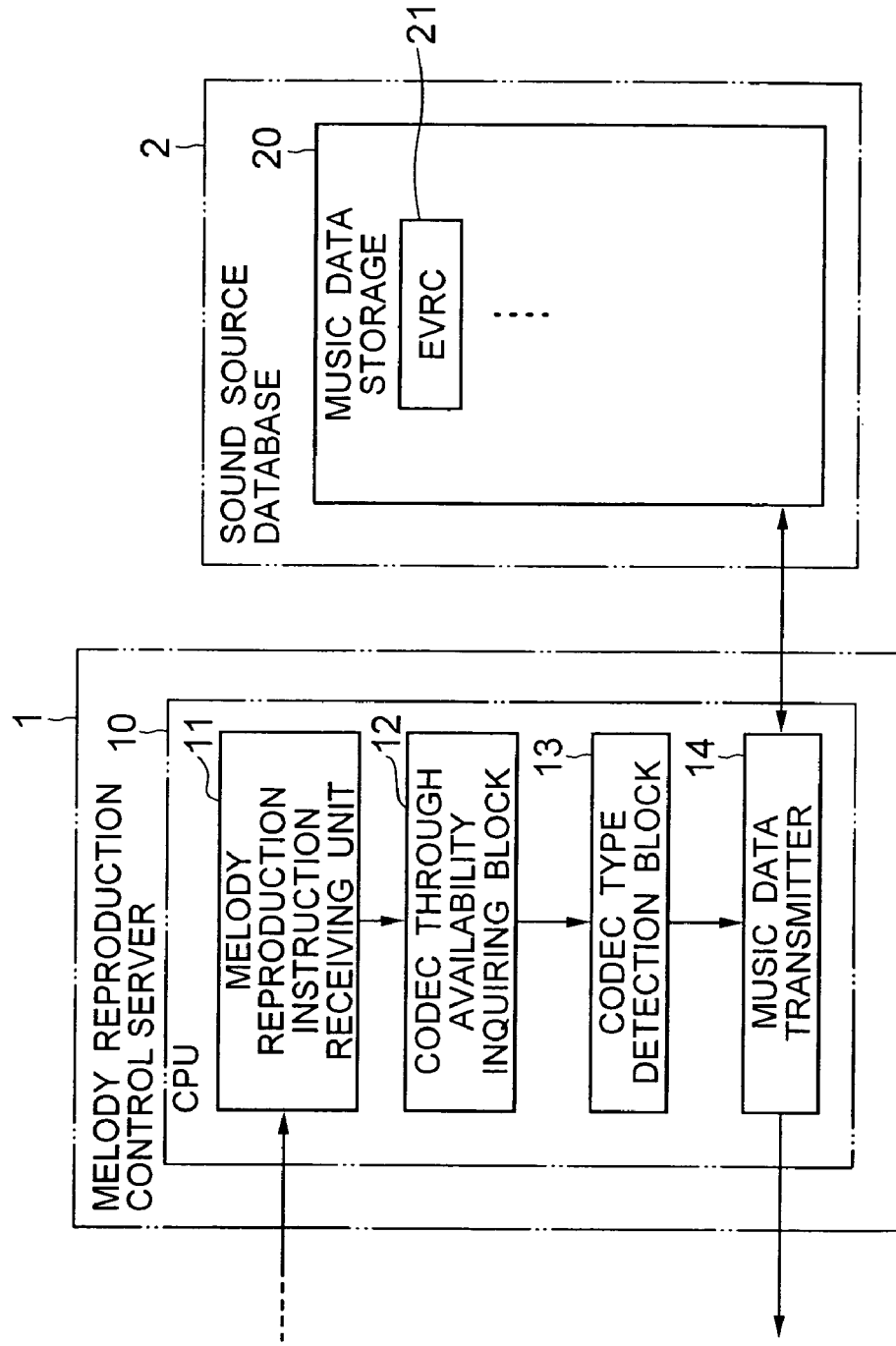
FIG. 2 is a function block diagram showing the configuration of the melody reproduction control server in the embodiment 1.
Figure 3:
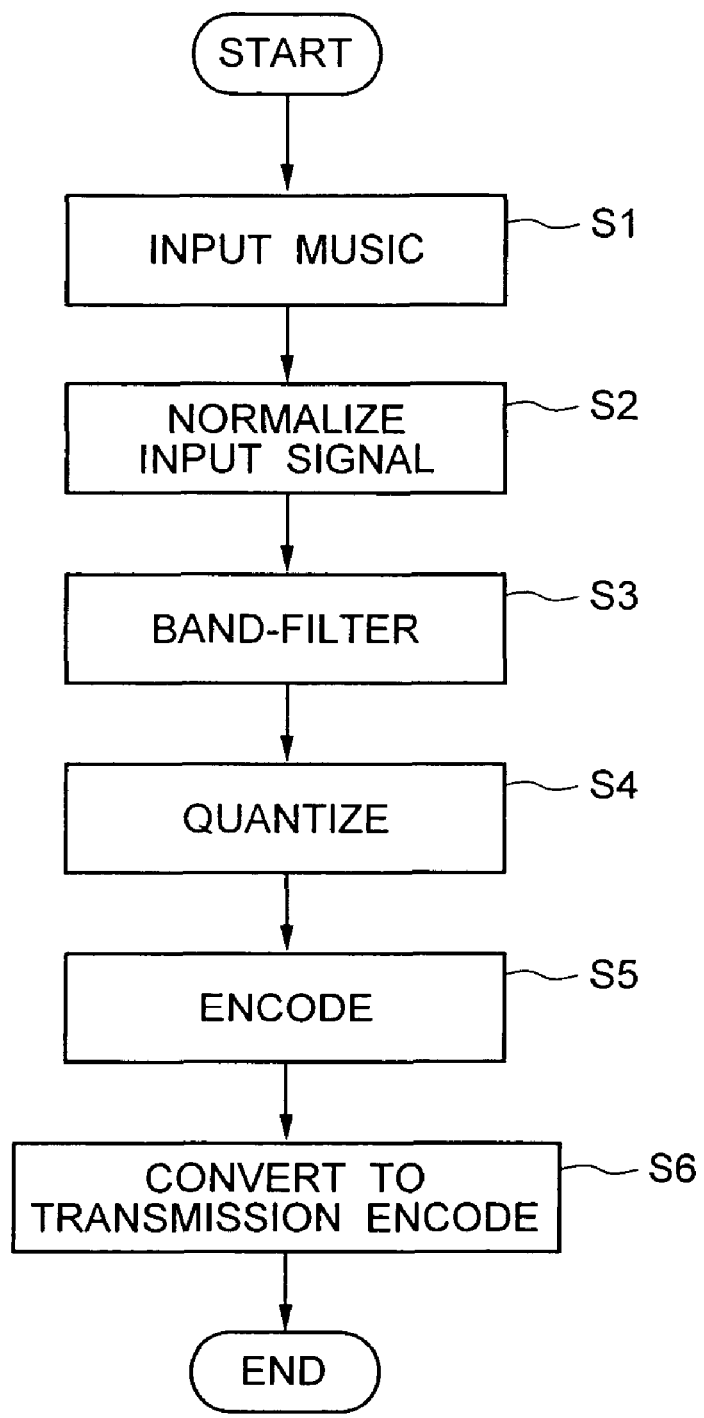
FIG. 3 is a flowchart showing the flow of music encoding processing in the embodiment of the present invention.
Figure 4:
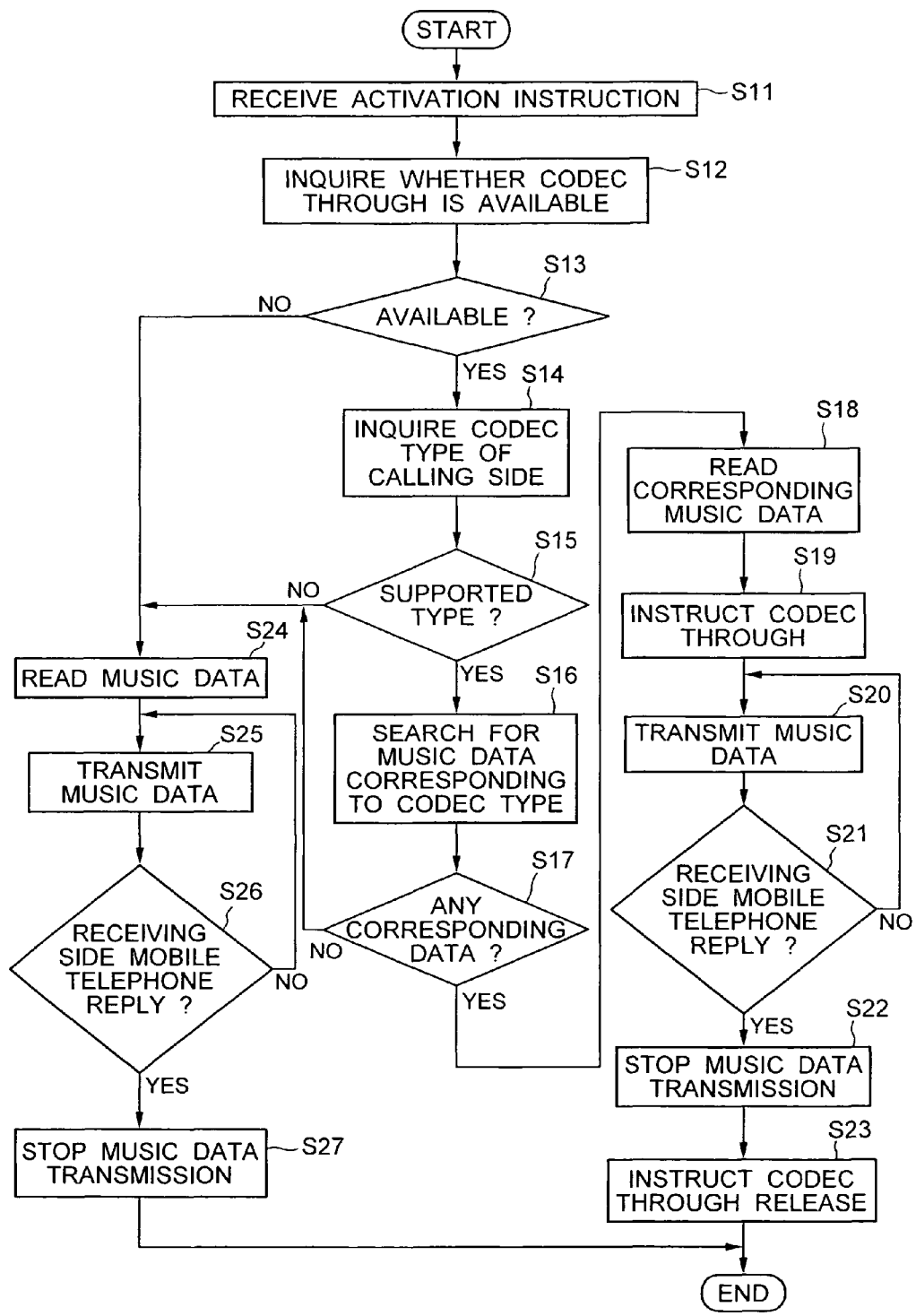
FIG. 4 is a flowchart showing the operation of the melody reproduction control server in the embodiment 1.
Figure 5:
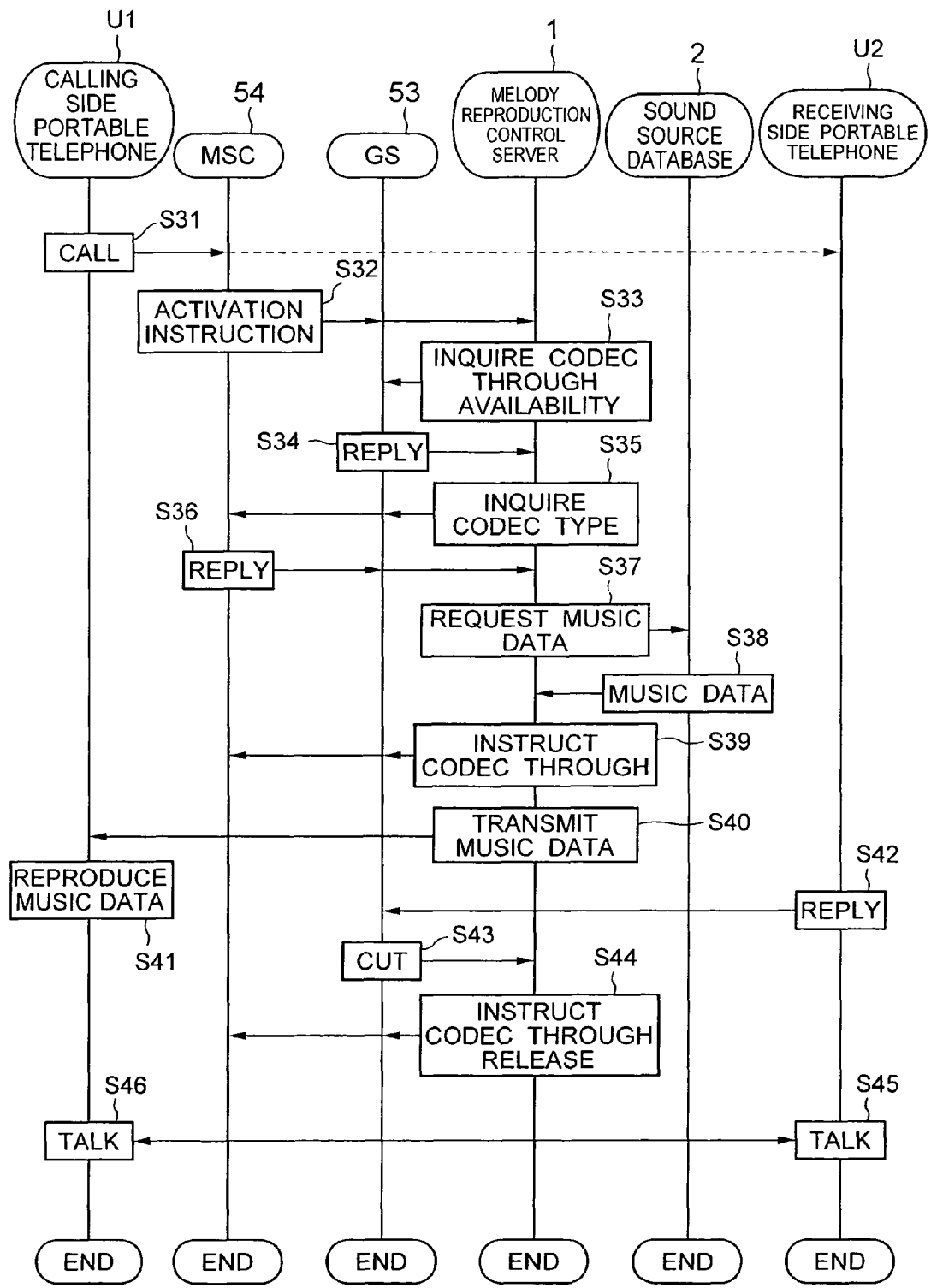
FIG. 5 is a sequence chart showing the operation of the overall system in the embodiment 1.
Figure 6:
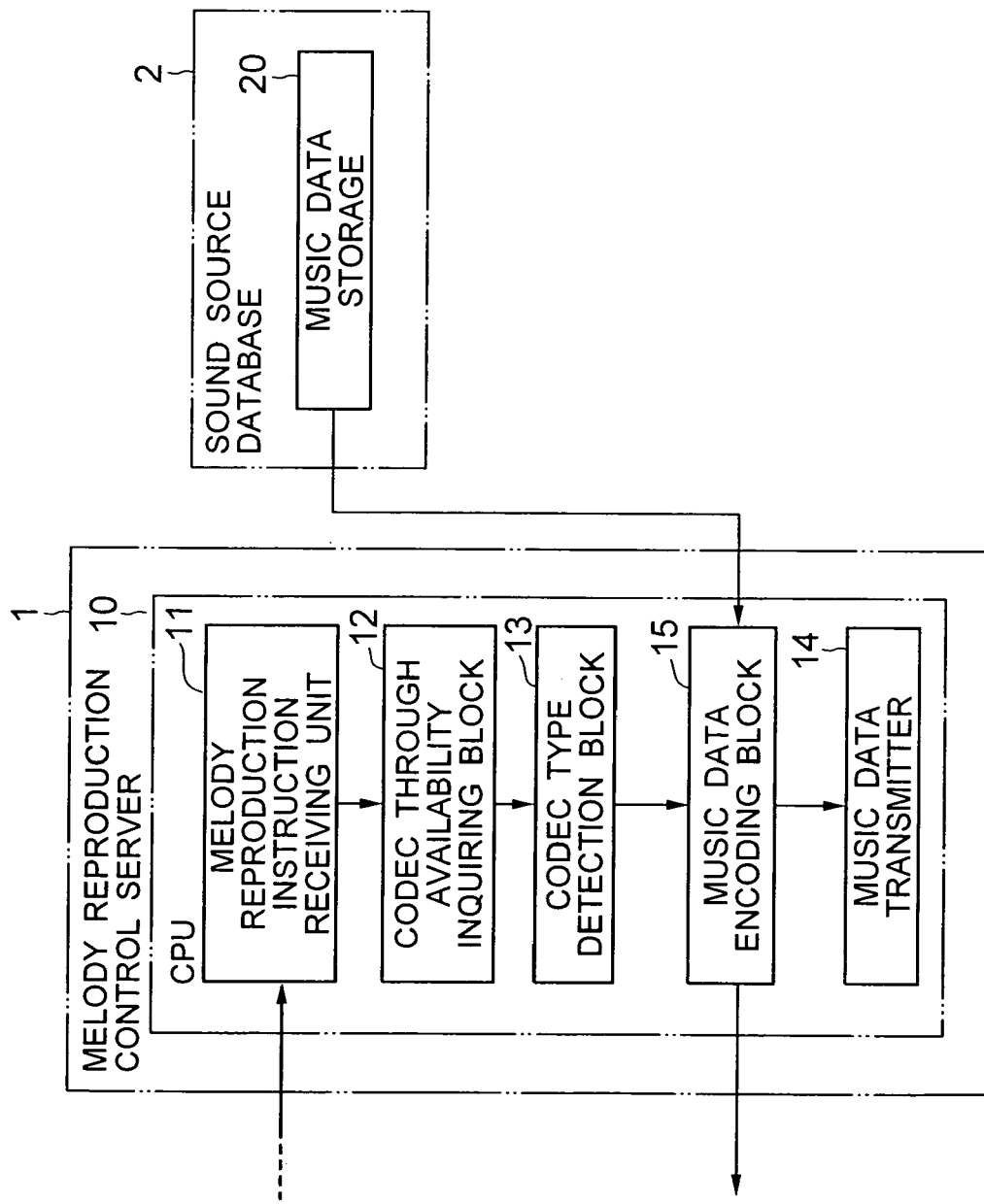
FIG. 6 is a function block diagram showing the configuration of the melody reproduction control server in the embodiment 2.
Figure 7:
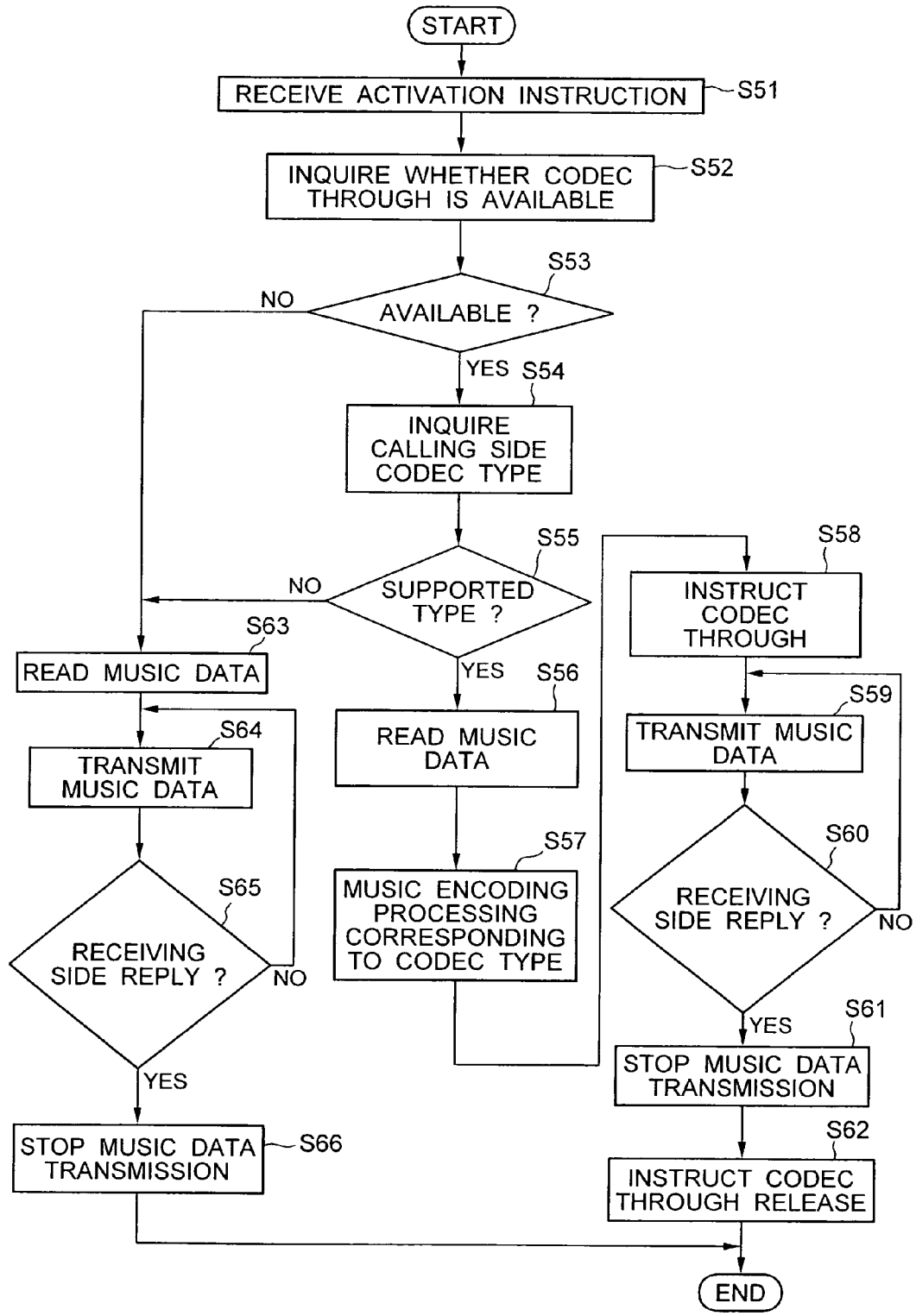
FIG. 7 is a flowchart showing the operation of the melody reproduction control server in the embodiment 2.
Figure 8:
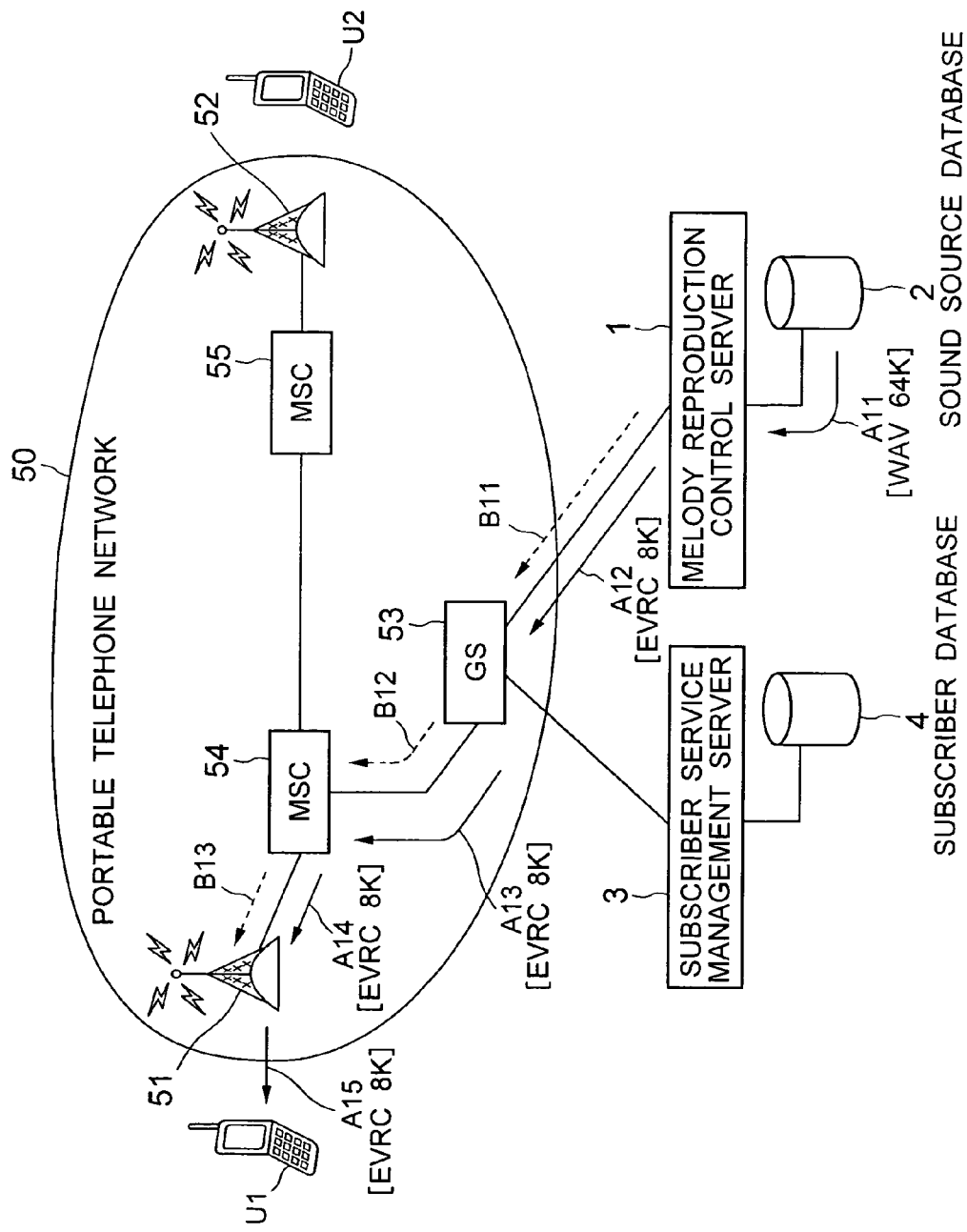
FIG. 8 is a schematic diagram showing the configuration of the overall system in the embodiment 2, in which a state of transmitting music data is shown.
Figure 9:
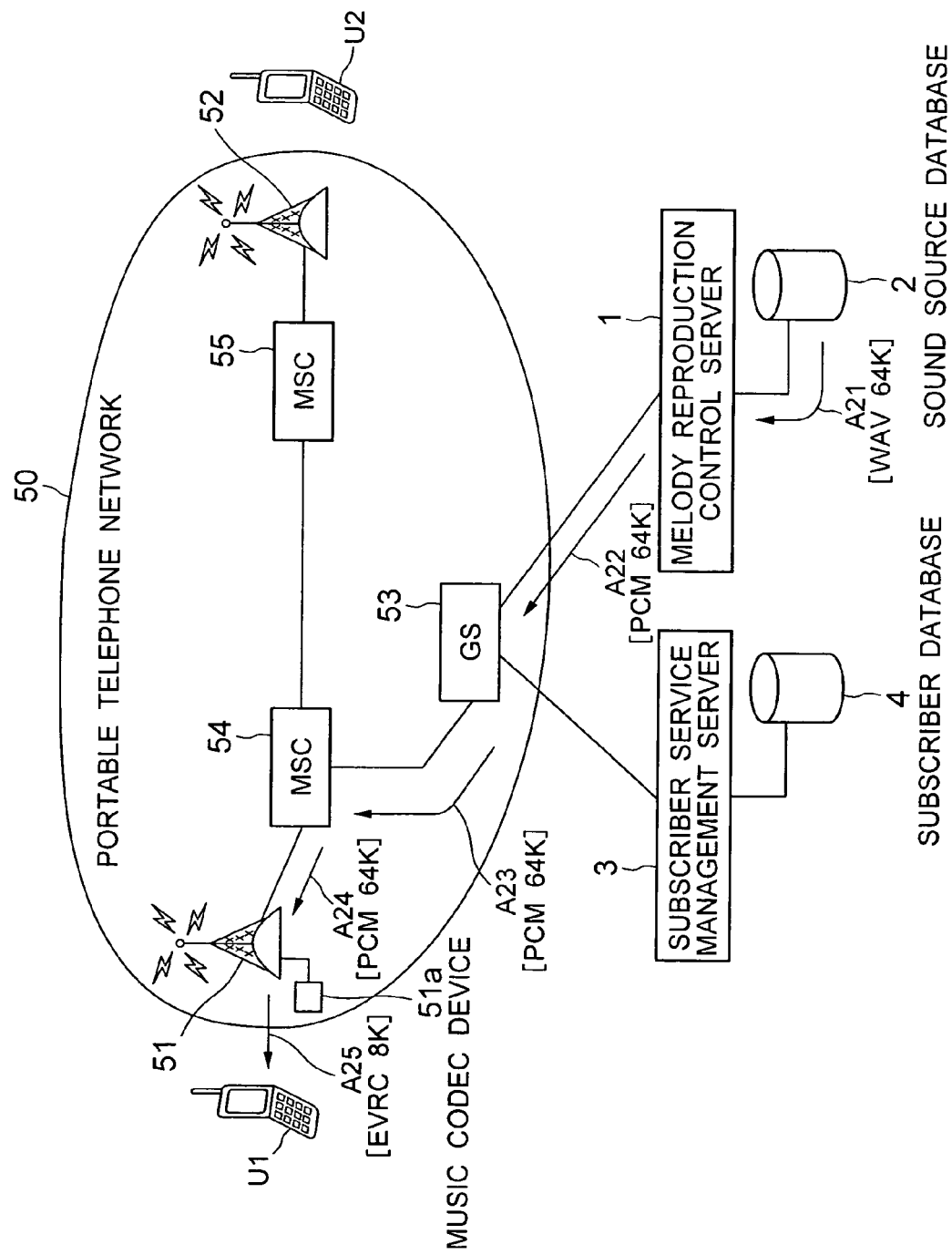
FIG. 9 is a schematic diagram showing the configuration of the overall system in the embodiment 3, in which a state of transmitting music data is shown.
Figure 10:
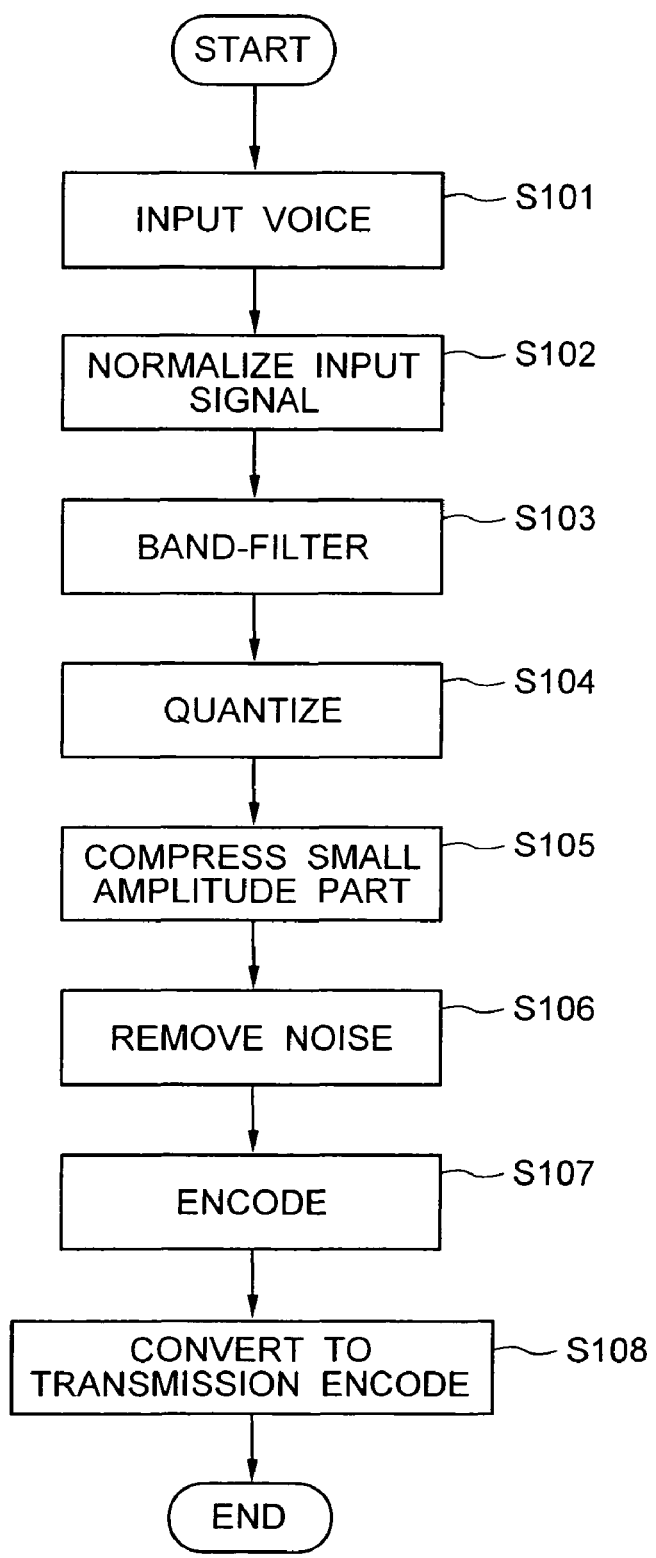
FIG. 10 is a flowchart showing the flow of voice encoding processing.
Figure 11:
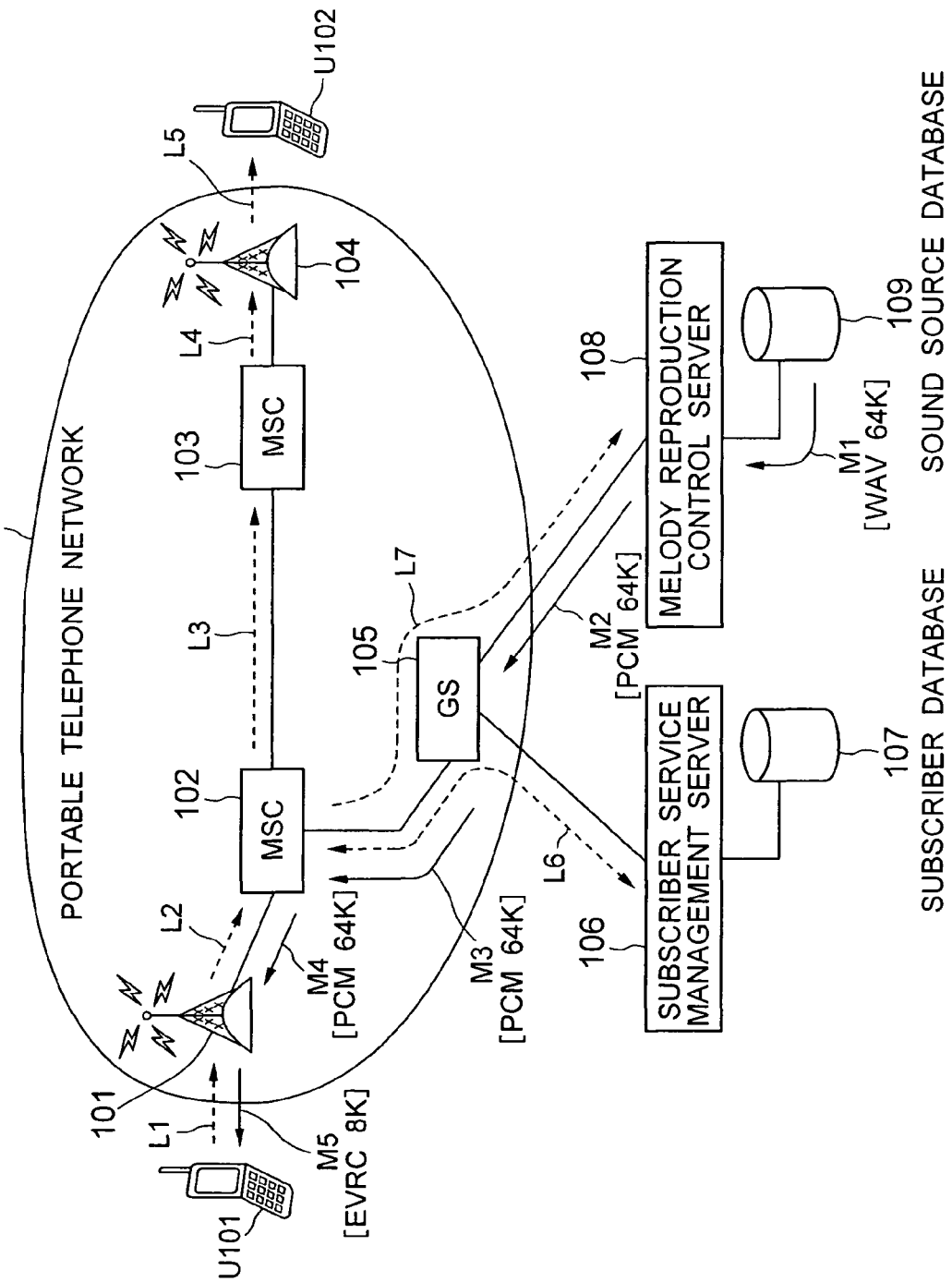
FIG. 11 is a schematic diagram showing the configuration of overall system realizing a ring-back melody service in a conventional example.
Figure 12A:
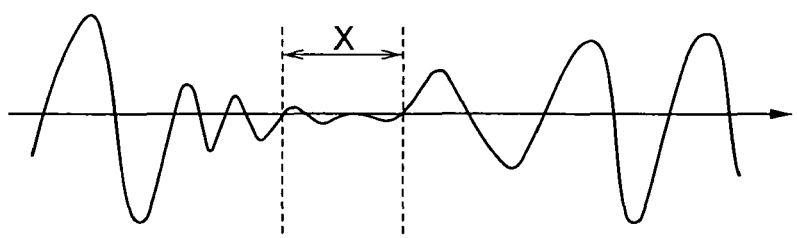
FIGS. 12(a) and 12(b) are illustrations showing states of signals in a part of voice encoding processing.
Figure 12B:
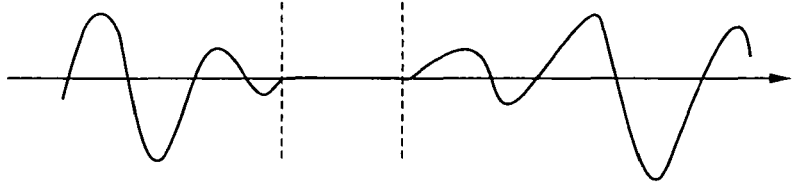

DESCRIPTION OF REFERENCE NUMERALS 1 melody reproduction control server (music providing device)
2 sound source database (music data storing unit)
3 subscriber service management server
4 subscriber database
11 melody reproduction instruction receiving unit
12 codec through availability inquiring block (codec through availability inquiring unit)
13 CODEC type detection block (CODEC type detection unit)
14 music data transmitter (music data transmission unit)
15 music data encoding block (music data encoding unit, music encoding device)
20 music data storage (music data storing unit)
50 portable telephone network
51, 52 wireless base station
53 gateway switch (GS)
54, 55 mobile switching center (MSC)
U1 calling side portable telephone
U2 receiving side portable telephone

What is claimed is:

1. A sound source providing system for providing sound to a portable telephone via a wireless base station, comprising, a sound data transmission unit for transmitting sound data to the portable telephone by codec through in the wireless base station, wherein the sound is data previously encoded corresponding to a CODEC of the portable telephone, the portable telephone being one in which encoding processing including noise removal processing is performed to sound at a time of talking, further comprising: a sound data storing unit for accumulating sound data previously encoded by encoding processing corresponding to a CODEC type of the portable telephone; a CODEC type detection unit for detecting the CODEC type of the portable telephone; and a sound data transmission unit for obtaining sound data corresponding to the detected CODEC type of the portable phone from the sound data storing unit, and transmitting the sound data to the portable telephone by codec through in the wireless base station.

2. The sound source providing system, as claimed in claim 1, further comprising, a codec through availability inquiring unit for inquiring whether transmission of the sound data to the portable telephone by codec through is available in the wireless base station, wherein as a result of inquiry by the codec through availability inquiring unit, if the codec through is available, the sound data transmission unit has a function of transmitting sound data corresponding to the CODEC type detected by the CODEC type detection unit to the portable telephone.

3. The sound source providing system, as claimed in claim 1, wherein the sound data is data encoded without noise removal processing in the encoding processing, different from the encoding processing.

4. The sound source providing system, as claimed in claim 1, wherein the sound data transmission unit operates to transmit the sound data instead of a ring-back tone of the portable telephone.

5. A sound source providing device in which sound data to be provided to a portable telephone by codec through in a wireless base station is accumulated, wherein the sound data accumulated is data previously encoded by encoding processing corresponding to CODEC of the portable telephone, comprising: a CODEC type detection unit for detecting a CODEC type of the portable telephone; a sound data transmission unit for transmitting sound data corresponding to the CODEC type of the portable telephone detected by the CODEC type detection unit, among the sound data accumulated, to the portable telephone by codec through in the wireless base station.

6. The sound source providing device, as claimed in claim 5, further comprising, a codec through availability inquiring unit for inquiring whether transmission of the sound data to the portable telephone by the codec through is available in the wireless base station, wherein as a result of inquiry by the codec through availability inquiring unit, if codec through is available, the sound data transmission unit has a function of transmitting sound data corresponding to the CODEC type detected by the CODEC type detection unit to the portable telephone.

7. A sound source providing method to provide sound to a portable telephone by using a computer for providing sound data, comprising: a CODEC type detecting step to detect a CODEC type of the portable telephone; a sound data selecting step to extract sound data corresponding to the CODEC type detected in the CODEC type detecting step, among sound data previously encoded by encoding processing corresponding to the CODEC of the portable telephone and accumulated; and a sound data transmitting step to transmit the sound data extracted to the portable telephone by codec through in the wireless base station.

8. A sound source providing method to provide sound to a portable telephone by using a computer for providing sound data, comprising: a CODEC type detecting step to detect a CODEC type of the portable telephone; a sound data selecting step to extract sound data corresponding to the CODEC type detected in the CODEC type detecting step, among sound data previously encoded by encoding processing without noise removal processing different from voice encoding processing of a portable telephone, corresponding to the CODEC of the portable telephone and accumulated; and a sound data transmitting step to transmit the sound data extracted to the portable telephone by codec through in the wireless base station.

9. The sound source providing method, as claimed in claim 7, further comprising, before the sound data transmitting step, a codec through availability inquiring step to inquire whether transmission of the sound data to the portable telephone by codec through is available in the wireless base station, wherein as a result of inquiry in the codec through availability inquiring step, if codec through is available in the sound data transmitting step, music data corresponding to the CODEC type detected in the CODEC type detecting step is transmitted to the portable telephone.

10. A sound source providing system for providing sound to a portable telephone in which sound encoding processing including noise removal processing is performed to voice at a time of talking, comprising: a CODEC type detection unit for detecting a CODEC type of the portable telephone; a sound data encoding unit for encoding sound data previously stored, serving as a sound source, by encoding processing corresponding to the CODEC type detected by the CODEC type detection unit; and a sound data transmission unit for transmitting the sound data encoded to the portable telephone by codec through in the wireless base station.

11. The sound source providing system, as claimed in claim 10, further comprising, a codec through availability inquiring unit for inquiring whether transmission of the sound data to the portable telephone by codec through is available in the wireless base station, wherein as a result of inquiry by the codec through availability inquiring unit, if codec through is available, the sound data encoding unit has a function of creating sound data corresponding to the CODEC type detected by the CODEC type detection unit.

12. The sound source providing system, as claimed in claim 10, wherein the sound data encoding unit performs encoding without noise removal processing in the encoding processing, different from the sound encoding processing.

13. A sound data providing system comprising a wireless base station which performs encoding including noise removal processing to voice at a time of talking and a sound source providing device which transmits sound data to the portable telephone via the wireless base station, wherein the wireless base station includes a sound CODEC unit for performing encoding to sound data transmitted from the sound source providing device without noise removal processing, different from voice CODEC, corresponding to a CODEC of the portable telephone.

* * * * *